US012438312B2

(12) United States Patent
Hu

(10) Patent No.: US 12,438,312 B2
(45) Date of Patent: Oct. 7, 2025

(54) POWER SOCKET FOR DETECTING POWER PLUG

(71) Applicants: HYUNDAI MOTOR COMPANY, Seoul (KR); Kia Corporation, Seoul (KR)

(72) Inventor: Xi Zhen Hu, Shandong (CN)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 313 days.

(21) Appl. No.: 18/207,375

(22) Filed: Jun. 8, 2023

(65) Prior Publication Data

US 2024/0136777 A1 Apr. 25, 2024
US 2024/0235130 A9 Jul. 11, 2024

(30) Foreign Application Priority Data

Oct. 19, 2022 (CN) ........................ 202211279331.4

(51) Int. Cl.
*H01R 13/703* (2006.01)
*H01R 13/66* (2006.01)
*H01R 13/447* (2006.01)

(52) U.S. Cl.
CPC ..... *H01R 13/6683* (2013.01); *H01R 13/7036* (2013.01); *H01R 13/447* (2013.01); *H01R 2201/26* (2013.01)

(58) Field of Classification Search
None
See application file for complete search history.

(56) References Cited

U.S. PATENT DOCUMENTS 8,035,045 B2 10/2011 Bremicker et al.
10,038,283 B2 * 7/2018 Oddsen .................. H01R 24/78

FOREIGN PATENT DOCUMENTS

CN 201181681 Y * 1/2009 ......... H01R 13/7135
CN 101707304 A * 5/2010 ........... H01R 25/006
CN 108736275 A * 11/2018 ............. H01R 24/20
JP 2007-110857 A 4/2007
JP 2015-139327 A 7/2015
WO WO-2019073224 A1 * 4/2019 ............. H01R 24/78

* cited by examiner

*Primary Examiner* — Tho D Ta
(74) *Attorney, Agent, or Firm* — MORGAN, LEWIS & BOCKIUS LLP

(57) ABSTRACT

A power socket includes a terminal support base, at least one set of conductive terminals, at least one slider, an elastic component, a circuit board component, a photoelectric sensor, and a controller, wherein the photoelectric sensor is configured to detect the extending plate passing through the through hole to generate a trigger signal, and the controller is electrically connected to the photoelectric sensor and at least one set of conductive terminals, and the controller is configured to control the corresponding conductive terminal to be conducted according to the trigger signal.

15 Claims, 7 Drawing Sheets

POWER SOCKET FOR DETECTING POWER PLUG

CROSS-REFERENCE TO RELATED APPLICATION

The present application claims priority to Korean Patent Application No. 202211279331.4 filed in the Chinese National Intellectual Property Administration on Oct. 19, 2022, the entire contents of which is incorporated herein for all purposes by this reference.

BACKGROUND OF THE PRESENT DISCLOSURE

Field of the Present Disclosure

The present disclosure relates to the field of vehicles, and more to a power socket capable of detecting a power plug.

Description of Related Art

In general, an inverter system is provided in a vehicle. The inverter system may convert a DC voltage of a battery into an AC voltage and use the AC voltage to supply power to a motor. Additionally, the inverter system may also output the AC voltage to a conductive terminal inside an AC socket through a cable so that the AC voltage may be used in various electrical devices which may be inserted into the AC socket.

When a power plug is not inserted, the conductive terminal inside the AC socket in the related art is generally in a charged state, which may cause the following defects.

Because the conductive terminal is electrical, there may be a safety concern.

On the other hand, the conductive terminal consumes a small amount of power, resulting in power loss.

Therefore, the AC socket in the related art needs to be further improved.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a power socket configured for detecting a power plug, which allows a conductive terminal to conduct electricity only when the power plug is inserted and prevents the conductive terminal from conducting electricity when the power plug is not inserted, preventing safety concerns and unnecessary power consumption.

Various aspects of the present disclosure are directed to providing a power socket configured for detecting a power plug. The power socket includes a terminal support base, at least one set of conductive terminals, at least one slider, an elastic component, a circuit board component, a photoelectric sensor, and a controller.

The terminal support base is provided with at least one first through hole and at least one guide column extending toward a first side of the terminal support base, the at least one set of conductive terminals is provided on the first side of the terminal support base, the at least one slider is provided between the at least one set of conductive terminals and the terminal support base and is slidable along the corresponding guide column, and the at least one slider includes a stopper plate and an extending plate extending in a direction from the stopper plate to the terminal support base, the elastic component is provided between the at least one slider and the terminal support base to restore the at least one slider to an original position thereof the circuit board component is provided on a second side of the terminal support base, the circuit board component is provided with at least one second through hole, and the extending plate of the at least one slider passes through the at least one first through hole of the terminal support base and the at least one second through hole of the circuit board component, the photoelectric sensor is configured to detect the extending plate passing through the at least one first through hole and the at least one second through hole, and generate a trigger signal when the extending plate is detected by the sensor, and the controller is electrically connected to the photoelectric sensor and the at least one set of conductive terminals and is configured to receive the trigger signal from the sensor and control the corresponding conductive terminal to be conducted according to the trigger signal.

The terminal support base includes a base plate, the base plate is provided with a position limiting plate set corresponding to the at least one slider, each position limiting plate set includes at least one position limiting plate, the at least one position limiting plate extends in a direction from the base plate to the conductive terminal, each position limiting plate is provide with a position limiting groove, at least one end portion of the stopper plate of the at least one slider is provided with a boss corresponding to the position limiting groove, and the boss is inserted into the position limiting groove of the corresponding position limiting plate.

The elastic component includes a first elastic member, the first elastic member is fitted to the guide column, and the first elastic member is positioned between the stopper plate and the base plate.

The at least one slider further includes an extending column extending in a direction from the stopper plate to the circuit board component, the elastic component further includes a second elastic member, the second elastic member is fitted to the extending column, and the second elastic member is located between the stopper plate and the base plate.

A guide hole corresponding to the extending column is provided on the base plate.

A through hole is provided in the stopper plate so that the guide column passes through the through hole.

The power socket further includes an upper housing and a lower housing, and the upper housing and the lower housing surround a receiving space, and the receiving space is configured to surround and support the circuit board component, the terminal support base, and the conductive terminal.

An insertion hole is provided in the upper housing so that the power plug is inserted into the insertion hole, and the power socket further includes a cover plate provided in the upper housing to cover the insertion hole of the upper housing.

Two sets of the conductive terminals are provided, two sliders are provided to correspond to the two sets of the conductive terminals, and two photoelectric sensors are provided to correspond to the two sets of the conductive terminals.

The photoelectric sensor is provided on one side of the circuit board component away from the terminal support base.

The power socket configured for detecting the power plug according to the exemplary embodiment of the present disclosure pushes the extending plate of the at least one slider to pass through the at least one first through hole of the terminal support base and the second through hole of the circuit board component by use of pushing force of the inserted power plug, so that the photoelectric sensor generates the trigger signal and the trigger signal triggers the controller to control the conductive terminal to be conducted. Accordingly, it is possible to prevent safety concerns and unnecessary power consumption by allowing the conductive terminal to conduct electricity only when the power plug is inserted and preventing the conductive terminal from conducting electricity when the power plug is not inserted.

The method and apparatus of the present disclosure have other characteristics and advantages, and these characteristics and advantages will become apparent from the accompanying drawings and the following exemplary embodiments in the text, or will be described in detail in the drawings attached to the text and the exemplary embodiments to be described later, and both these drawings and exemplary embodiments are intended to interpret certain principles of the present disclosure.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
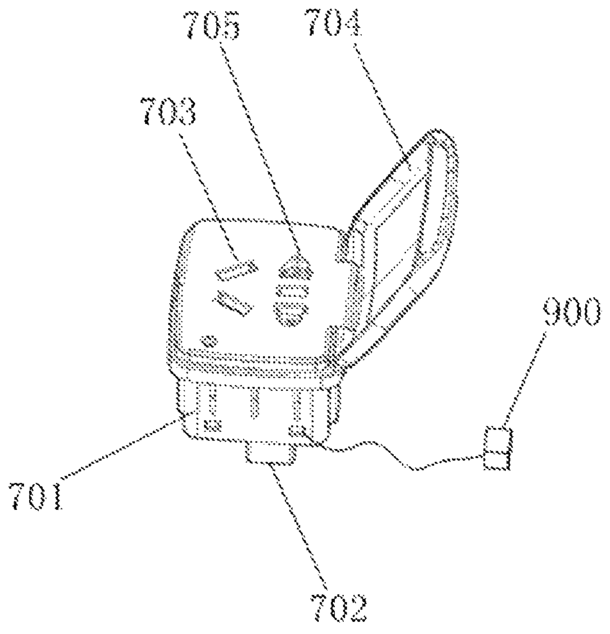
FIG. 1 is a three-dimensional schematic diagram of a power socket configured for detecting a power plug according to various exemplary embodiments of the present disclosure.

It should be understood that the drawings are not necessarily drawn to scale, and are intended to explain the basic principles of the present disclosure in simplified representations representing various features. Specific design features included in an exemplary embodiment of the present disclosure (including, for example, specific sizes, directions, positions, and shapes) are specifically determined in part according to applications and environments in which an exemplary embodiment of the present disclosure will be used.

In such drawings, the same reference numbers throughout the drawings indicate identical or equivalent parts of the present disclosure.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be referred to in detail and will be described later by exemplifying these exemplary embodiments in the drawings. While the present disclosure has been described in conjunction with exemplary embodiments of the present disclosure, it is to be understood that the present specification is not intended to limit the present disclosure to the exemplary embodiments of the present disclosure. To the contrary, the present disclosure not only includes these exemplary embodiments of the present disclosure, but also includes various alternatives, modifications, equivalents, and other implementations within the spirit of the present disclosure and the scope defined by the appended claims.

Hereinafter, a power socket configured for detecting a power plug according to various exemplary embodiments of the present disclosure will be described referring to FIGS. 1 to 7.

As illustrated in FIGS. 1 to 7, a power socket configured for detecting a power plug according to various exemplary embodiments of the present disclosure includes a terminal support base 100, at least one set of conductive terminals 201 and 202, at least one slider 301 and 302, an elastic component 400, a circuit board component 500, a photoelectric sensor 600, and a controller 900.

The terminal support base 100 is formed of at least one first through hole 101 and at least one guide column 102 extending toward a first side (that is, an upper side of FIGS. 1 to 6) of the terminal support base 100.

The conductive terminals 201 and 202 are provided on the first side of the terminal support base 100, and the conductive terminals 201 and 202 are used to receive and be connected to corresponding power plugs 800. The conductive terminals 201 and 202 may receive an AC voltage output by an inverter system and output the AC voltage to the power plug 800 to use a corresponding electric device.

The sliders 301 and 302 are provided between at least one set of conductive terminals 201 and 202 and the terminal support base 100 to slide along the corresponding guide columns 102. Each of the sliders 301 and 302 includes a stopper plate 303 and an extending plate 304 extending from the stopper plate 303 in a direction approaching the terminal support base 100 (see FIGS. 3 and 7).

The elastic component 400 is provided between each of the sliders 301 and 302 and the terminal support base 100 to restore the sliders 301 and 302 to original positions.

The circuit board component 500 is provided on a second side (that is, a lower side in FIGS. 1 to 6) of the terminal support base 100. The circuit board component 500 is provided with at least one second through hole 501 (see also FIG. 3), and the extending plates 304 of the sliders 301 and 302 may penetrate the first through hole 101 of the terminal support base 100 and the second through hole 501 of the circuit board component 500.

The photoelectric sensor 600 is for detecting the extending plate 304 passing through the first through hole 101 and the second through hole 501, and when the extending plate 304 is detected, the photoelectric sensor 600 may be configured to generate a trigger signal.

The controller 900 is electrically connected to the photoelectric sensor 600 and the conductive terminals 201 and 202. The controller 900 may receive the trigger signal of the photoelectric sensor 600 and control the corresponding conductive terminals 201 and 202 to conduct electricity according to the trigger signal. The controller 900 is provided on a vehicle body.

When the power plug 800 is inserted into the power socket configured for detecting the power plug, the sliders 301 and 302 are pushed by the power plug 800 passing through the conductive terminal and move in a direction approaching the circuit board component 500 (that is, in a lower direction in FIGS. 1 to 6) while overcoming elasticity of the elastic component 400. Furthermore, the extending plates 304 of the sliders 301 and 302 are allowed to pass through the first through hole 101 of the terminal support base 100 and the second through hole 501 of the circuit board component 500 to cause the photoelectric sensor 600 to generate the trigger signal, and the trigger signal triggers the controller 900 to control the conductive terminal to be conducted, so that only when the power plug 800 is inserted, the conductive terminal conduct electricity.

When the power plug 800 is unplugged from the power socket configured for detecting the power plug, the compressed elastic member 400 pushes the sliders 301 and 302 to move (that is, be restored) in a direction away from the circuit board component 500, so that the photoelectric sensor 600 cannot detect the extending plates 304 of the sliders 301 and 302, making it impossible to generate the trigger signal. Because the controller 900 does not receive the trigger signal, the controller 900 is configured to control the conductive terminal to be cut off, preventing safety concerns and unnecessary power consumption.

In the exemplary embodiment of FIGS. 1 to 6, two sets of conductive terminals are provided, and include the conductive terminal 201 and the conductive terminal 202. Among the conductive terminals, the conductive terminal 201 may be provided for a 2-pin plug, and the conductive terminal 202 may be provided for a 3-pin plug.

One set of conductive terminals corresponds to one slider, and at the same time, corresponds to one photoelectric sensor 600, one first elastic member 401 (to be described below), and one second elastic member 402 (to be described below).

The conductive terminal 201 corresponds to the slider 301, one first elastic member 401, and one second elastic member 402, and the conductive terminal 202 corresponds to the slider 302, one first elastic member 401, and one second elastic member 402.

In the exemplary embodiment of FIGS. 1 to 6, two sets of conductive terminals are provided, but the number of conductive terminals may be adjusted according to circumstances. For example, 1 to 5 conductive terminals may be provided.

The number of the sliders, the number of the photoelectric sensors 600, the number of the first elastic members 401, and the number of the second elastic members 402 are the same as the number of the conductive terminals.

Figure 4:
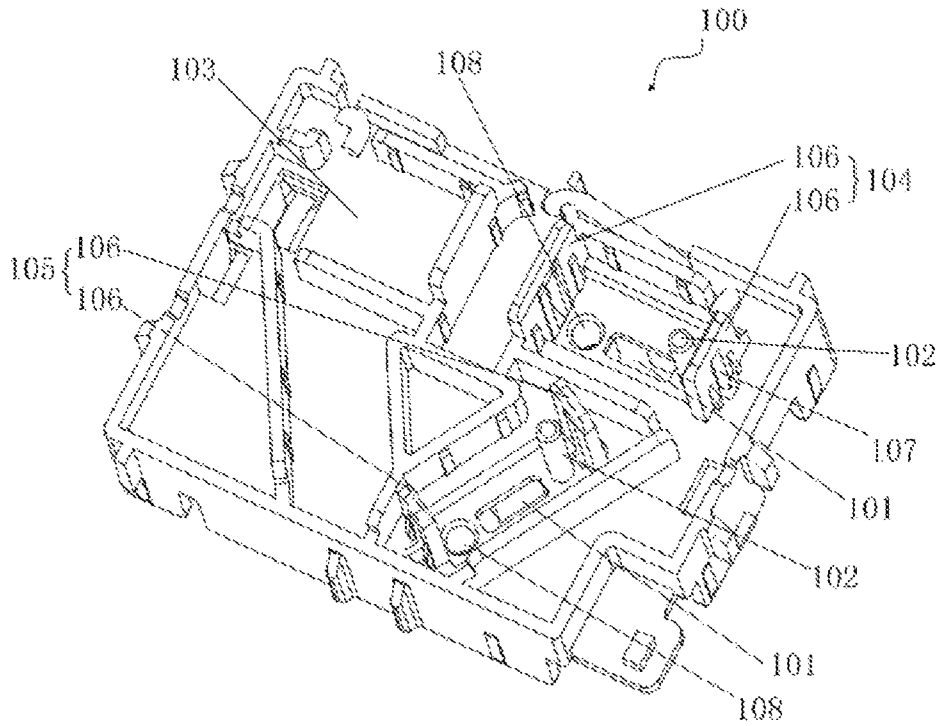
FIG. 4 is a structural schematic diagram of a terminal support base.
Figure 5:
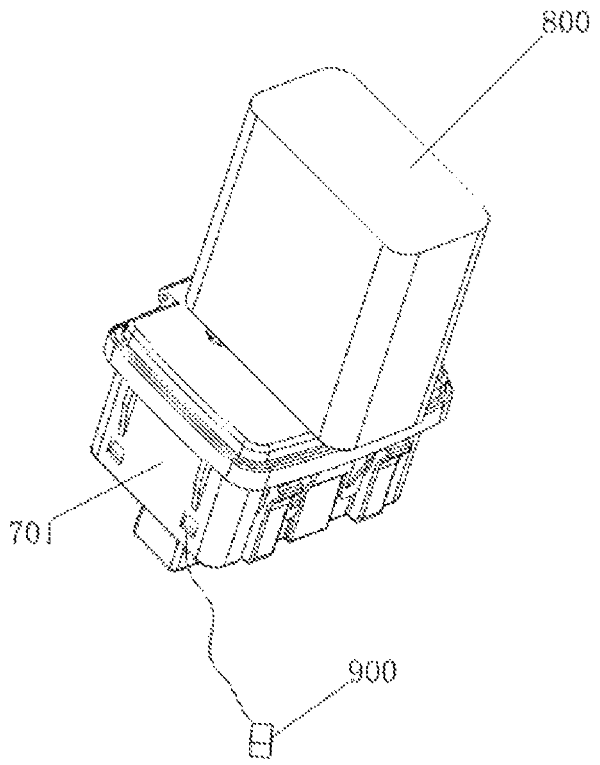
FIG. 5 is a structural schematic diagram in a state where a power plug is inserted into a power socket configured for detecting the power plug.
Figure 6:
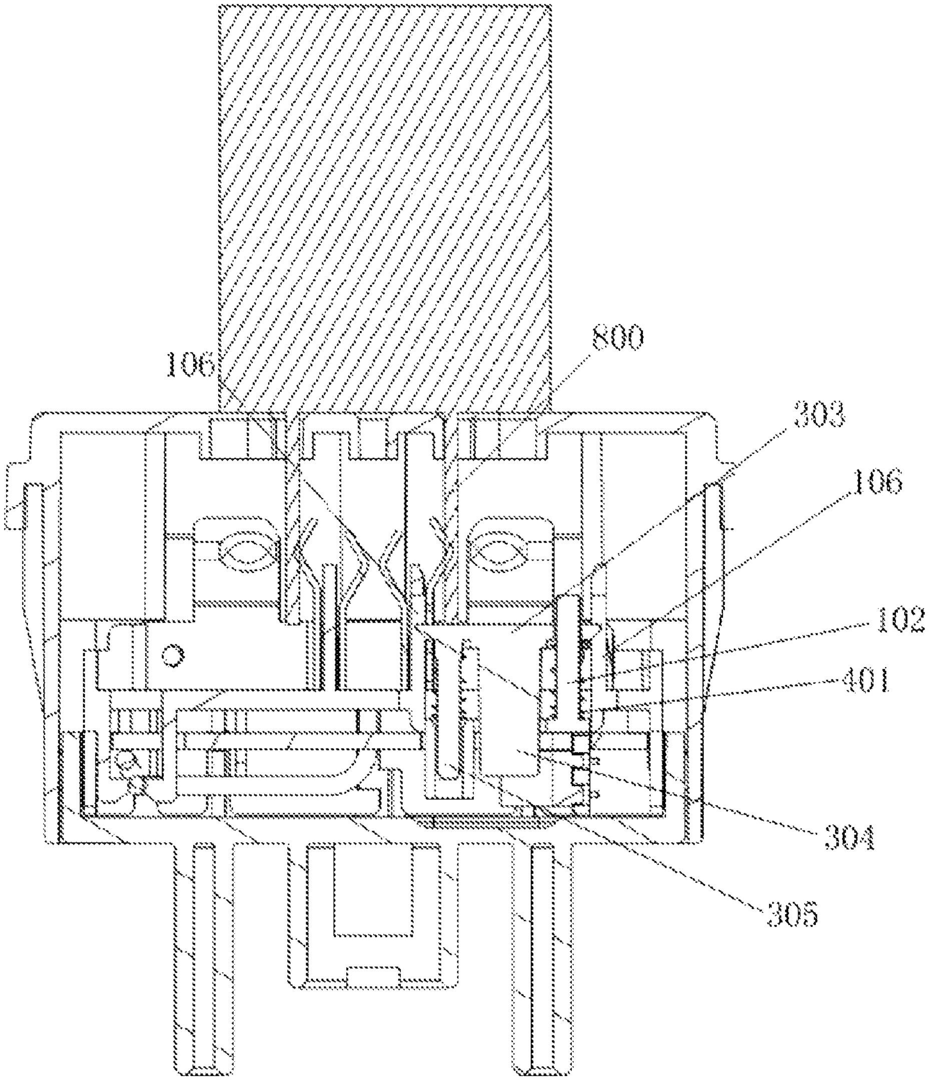
FIG. 6 is a cross-sectional view of FIG. 5.
Figure 7:
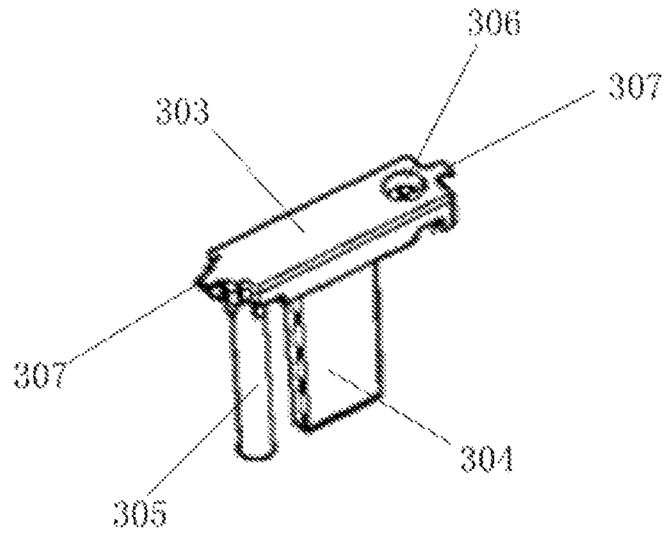
FIG. 7 is a structural schematic diagram of a slider.

In the exemplary embodiment of the present disclosure, as illustrated in FIGS. 4 and 7, the terminal support base 100 includes a base plate 103, and position limiting plate sets 104 and 105 corresponding to the sliders 301 and 302 are provided in the base plate 103. Each set of position limiting plate sets 104 and 105 includes two parallel position limiting plates 106, and the position limiting plate 106 extends from the base plate 103 in a direction approaching the conductive terminals 201 and 202. A position limiting groove 107 is provided in each position limiting plate 106, and bosses 307 corresponding to the position limiting grooves are provided at both end portions of the stopper plates 303 of the sliders 301 and 302.

The stopper plates 303 of the sliders 301 and 302 always apply pressure on the corresponding first elastic member 401 and the second elastic member 402, and the boss 307 is inserted into the corresponding position limiting groove 107 of the position limiting plate 106 so that the first elastic member 401 and the second elastic member 402 may always be in a compressed state, preventing the first elastic member 401 and the second elastic member 402 from being displaced due to shaking when the vehicle is moved.

The boss 307 of one end portion of the stopper plate 303 of the slider 301 is caught in the position limiting groove 107 of one position limiting plate 106 in the position limiting plate set 104, and the boss 307 of the other end portion of the stopper plate 303 of the slider 301 is caught in the position limiting groove 107 of the other position limiting plate 106 in the position limiting plate set 104.

The boss 307 of one end portion of the stopper plate 303 of the slider 302 is caught in the position limiting groove 107 of one position limiting plate 106 of the position limiting plate set 105, and the boss 307 of the other end portion of the stopper plate 303 of the slider 302 is caught in the position limiting groove 107 of the other position limiting plate 106 of the position limiting plate set 105.

In the exemplary embodiment of the present disclosure, the first through hole 101 and the guide column 102 are provided on the base plate 103.

In the exemplary embodiment of the present disclosure, as illustrated in FIGS. 3 to 7, the elastic component 400 includes the first elastic member 401. The first elastic member 401 is fitted to the guide column 102, and the first elastic member 401 is positioned between the stopper plate 303 and the base plate 103.

In the exemplary embodiment of the present disclosure, as illustrated in FIGS. 3 to 7, each of the sliders 301 and 302 further includes an extending column 305 extending in a direction from the stopper plate 303 to the circuit board component 500, and the elastic component 400 further includes the second elastic member 402. The second elastic member 402 is fitted to the extending column 305, and the second elastic member 402 is positioned between the stopper plate 303 and the base plate 103.

In the exemplary embodiment of the present disclosure, the first elastic member 401 and the second elastic member 402 may be springs. Here, the types of the first elastic member 401 and the second elastic member 402 are not limited thereto and may be any one type of the related art as long as the first elastic member 401 and the second elastic member 402 can realize the above function.

In the exemplary embodiment of the present disclosure, as illustrated in FIG. 4, a through guide hole 108 corresponding to the extending column 305 is provided in the base plate 103.

The second elastic member 402 fitted to the extending column 305 is positioned between a portion of the base plate 103 close to the guide hole 108 and the stopper plate 303.

The extending columns 305 of the sliders 301 and 302 are inserted into the corresponding guide holes 108. When the sliders 301 and 302 move toward or away from the circuit board component 500, the extending column 305 may slide along the guide hole 108.

In the exemplary embodiment of the present disclosure, as illustrated in FIG. 7, a through hole 306 is provided in the stopper plate 303 so that the corresponding guide column 102 pass through the through hole 306. Accordingly, the sliders 301 and 302 may be fitted to the corresponding guide columns 102 and slide along the corresponding guide columns 102, respectively.

The sliding of the sliders 301 and 302 may be made more stable due to a relative sliding of the extending column 305 and the guide hole 108 and a relative sliding of the through hole 306 and the guide column 102.

Figure 2:
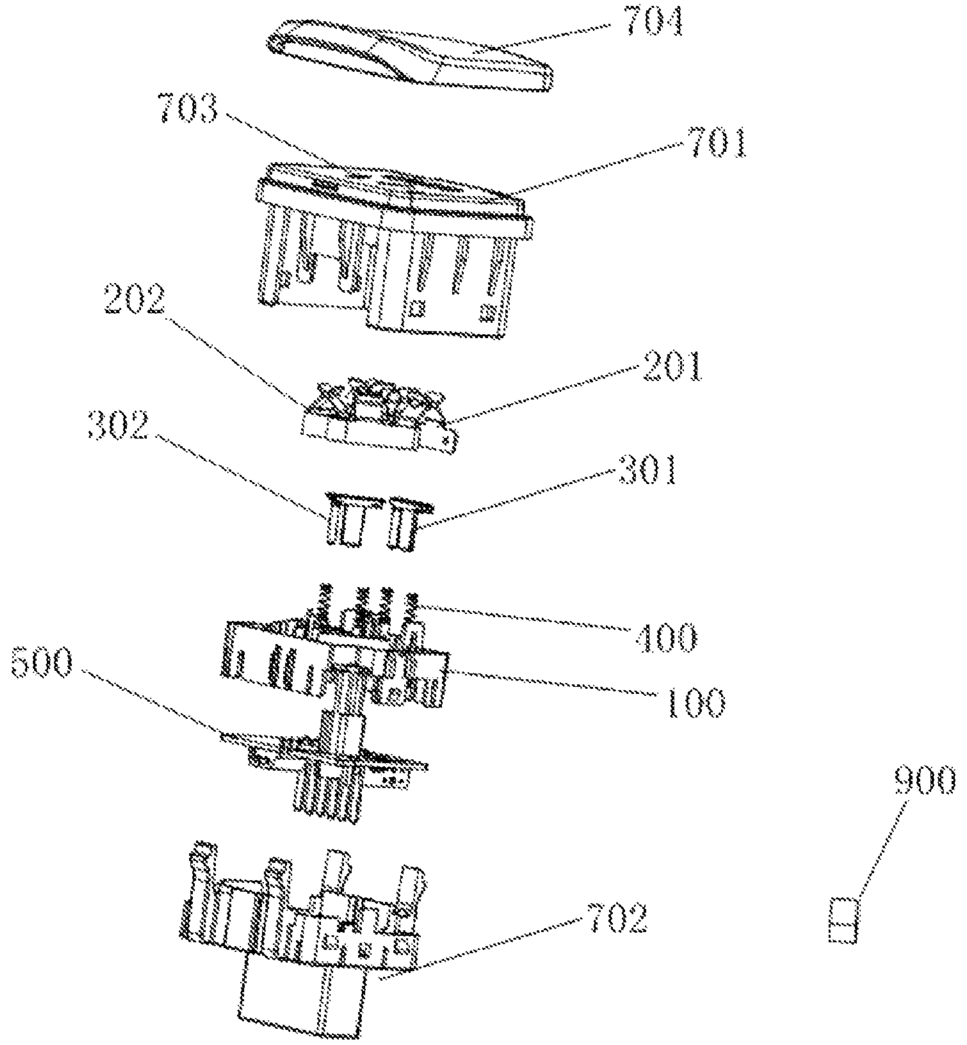
FIG. 2 is a three-dimensional exploded view of a power socket configured for detecting a power plug according to various exemplary embodiments of the present disclosure.
Figure 3:
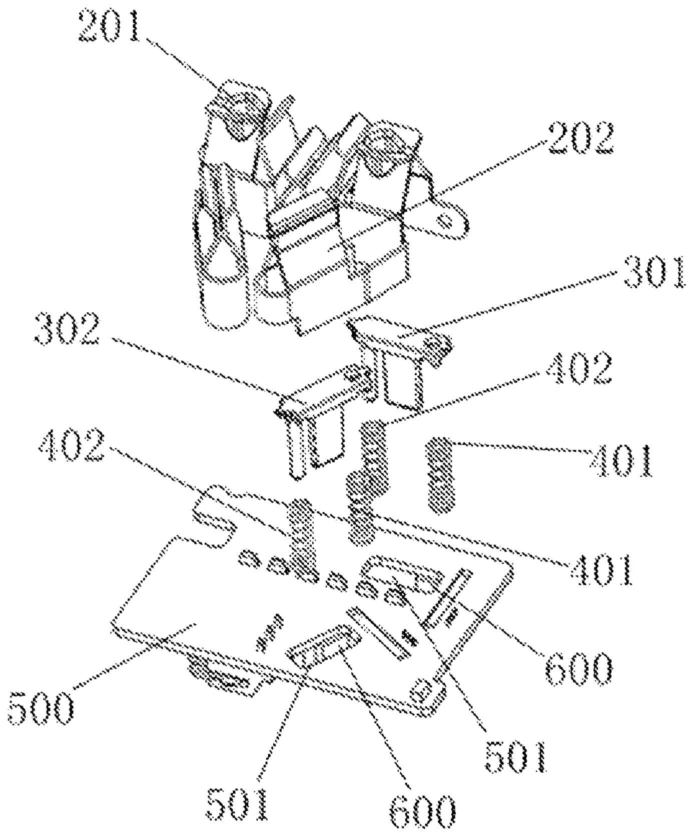
FIG. 3 is a schematic diagram of positions of a conductive terminal, a slider, an elastic component, and a circuit board component in FIG. 2.

In the exemplary embodiment of the present disclosure, as illustrated in FIG. 1 and FIG. 2, the power socket configured for detecting the power plug further includes an upper housing 701 and a lower housing 702. The upper housing 701 and the lower housing 702 may surround a receiving space, and the receiving space is for surrounding and supporting the circuit board component 500, the terminal supporting base 100, and the conductive terminals 201 and 202.

In the exemplary embodiment of the present disclosure, as illustrated in FIG. 1 and FIG. 2, the upper housing 701 is provided with insertion holes 703 and 705 into which the power plugs are inserted. The power socket configured for detecting the power plug further includes a cover plate 704 provided in the upper housing 701 to cover the insertion holes 703 and 705 of the upper housing 701.

The insertion hole 703 corresponds to the conductive terminal 202 and the insertion hole 705 corresponds to the conductive terminal 201.

In the exemplary embodiment of the present disclosure, the photoelectric sensor 600 is provided on one side of the circuit board component 500 away from the terminal support base 100.

The specific position of the photoelectric sensor 600 on the circuit board component 500 may be adjusted according to an actual situation as long as the photoelectric sensor 600 can realize the above function.

Various exemplary embodiments of the present disclosure further provides a vehicle in which the power socket configured for detecting the power plug is provided.

Hereinafter, an operation of the power socket configured for detecting the power plug of the exemplary embodiment of the present disclosure will be described in conjunction with the drawings.

The conductive terminal 201 may be provided for the 2-pin plug, and the conductive terminal 202 may be provided for the 3-pin plug.

The 2-pin plug is inserted into the insertion hole 703 of the upper housing 701 to pass through the conductive terminal 201. The slider 301 is pushed by the 2-pin plug and moved in the direction (that is, the lower direction in FIGS. 1 to 6) approaching the circuit board component 500 along the corresponding guide column 102 while overcoming the elasticity of the corresponding first elastic member 401 and the corresponding second elastic member 402. Accordingly, the extending plates 304 of the slider 301 passes through the corresponding second through hole 501 and the corresponding first through hole 101, so that the photoelectric sensor 600 corresponding to the conductive terminal 201 generates the trigger signal. The trigger signal triggers the controller 900 to control the conductive terminal 201 to be conducted.

The 3-pin plug is inserted into the insertion hole 705 of the upper housing 701 to pass through the conductive terminal 202. The slider 302 is pushed by the 3-pin plug and moved in the direction (that is, the lower direction in FIGS. 1 to 6) approaching the circuit board component 500 along the corresponding guide column 102 while overcoming the elasticity of the corresponding first elastic member 401 and the corresponding second elastic member 402. Accordingly, the extending plates 304 of the slider 301 passes through the corresponding second through hole 501 and the corresponding first through hole 101, so that the photoelectric sensor 600 corresponding to the conductive terminal 202 generates the trigger signal. The trigger signal triggers the controller 900 to control the conductive terminal 202 to be conducted.

In the exemplary embodiment of FIGS. 1 to 6, only one power plug 800 may be inserted due to a positional relationship between the conductive terminal 201 and the conductive terminal 202. That is, only the 2-pin plug or the 3-pin plug may be inserted.

When the 2-pin plug is inserted, only the conductive terminal 201 corresponding to the 2-pin plug conduct electricity, and the conductive terminal 202 corresponding to the 3-pin plug does not conduct electricity.

When the 3-pin plug is inserted, only the conductive terminal 202 corresponding to the 3-pin plug conduct electricity, and the conductive terminal 201 corresponding to the 2-pin plug does not conduct electricity.

Furthermore, the positional relationship between the conductive terminal 201 and the conductive terminal 202 may also be designed so that two power plugs 800 may be simultaneously inserted. That is, both the 2-pin plug and the 3-pin plug may be inserted at the same time (this case is not illustrated).

To better interpret and precisely define the appended claims, terms "top", "bottom", "inside", "outside", "upper surface", "lower surface", "of the upper surface", "of the lower surface", to the top", "to the bottom", "front", "back", "behind", "inside", "outside", "to the inside", "to the outside", "inner side", "external side", "of the inside", "of the outside", "forward", and "backward" are for describing the features of the exemplary embodiment with reference to the locations of these features illustrated in the drawings.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A power socket capable of detecting a power plug, the power socket comprising:

- a terminal support base, at least one set of conductive terminals, at least one slider, an elastic component, a circuit board component, a sensor, and a controller,
- wherein the terminal support base is provided with at least one first through hole and at least one guide column extending toward a first side of the terminal support base,
- wherein the at least one set of conductive terminals is provided on the first side of the terminal support base,
- wherein the at least one slider is provided between the at least one set of conductive terminals and the terminal support base and is slidable along a corresponding guide column, and the at least one slider includes a stopper plate and an extending plate extending in a direction from the stopper plate to the terminal support base,
- wherein the elastic component is provided between the at least one slider and the terminal support base to restore the at least one slider to an original position thereof
- wherein the circuit board component is provided on a second side of the terminal support base, the circuit board component is provided with at least one second through hole, and the extending plate of the at least one slider passes through the at least one first through hole of the terminal support base and the at least one second through hole of the circuit board component,
- wherein the sensor is configured to detect the extending plate passing through the at least one first through hole and the at least one second through hole, and generate a trigger signal when the extending plate is detected by the sensor, and
- wherein the controller is electrically connected to the sensor and the at least one set of conductive terminals and is configured to receive the trigger signal from the sensor and control a corresponding conductive terminal to be conducted according to the trigger signal.

2. The power socket of claim 1, wherein the sensor is a photoelectric sensor.

3. The power socket of claim 1, wherein the terminal support base includes a base plate, the base plate is provided with a position limiting plate set corresponding to the at least one slider, each position limiting plate set includes at least one position limiting plate, the at least one position limiting plate extends in a direction from the base plate to the corresponding conductive terminal, each position limiting plate is provided with a position limiting groove, at least one end portion of the stopper plate of the at least one slider is provided with a boss corresponding to the position limiting groove, and the boss is inserted into the position limiting groove of the corresponding position limiting plate.

4. The power socket of claim 3, wherein each set of position limiting plate sets includes two parallel position limiting plates extending from the base plate in a direction approaching the at least one set of conductive terminals.

5. The power socket of claim 3, wherein the elastic component includes a first elastic member, the first elastic member is fitted to the at least one guide column, and the first elastic member is positioned between the stopper plate and the base plate.

6. The power socket of claim 5, wherein the at least one slider further includes an extending column extending in a direction from the stopper plate to the circuit board component.

7. The power socket of claim 6, wherein the elastic component further includes a second elastic member, the second elastic member is fitted to the extending column, and the second elastic member is located between the stopper plate and the base plate.

8. The power socket of claim 7, wherein a guide hole corresponding to the extending column is provided on the base plate.

9. The power socket of claim 8, wherein the extending column of the at least one slider is inserted into the guide hole and when the at least one slider moves toward or away from the circuit board component, the extending column slides along the guide hole.

10. The power socket of claim 1, wherein a through hole is provided in the stopper plate so that the at least one guide column passes through the through hole.

11. The power socket of claim 1, further including an upper housing and a lower housing, wherein the upper housing and the lower housing surround a receiving space, and the receiving space is configured to surround and support the circuit board component, the terminal support base, and the conductive terminals.

12. The power socket of claim 11, wherein an insertion hole is provided in the upper housing so that the power plug is selectively inserted in the insertion hole.

13. The power socket of claim 12, wherein the power socket further includes a cover plate provided in the upper housing to cover the insertion hole of the upper housing.

14. The power socket of claim 1, wherein two sets of the conductive terminals are provided, two sliders are provided to correspond to the two sets of the conductive terminals, and two sensors are provided to correspond to the two sets of the conductive terminals.

15. The power socket of claim 1, wherein the sensor is provided on one side of the circuit board component away from the terminal support base.

* * * * *